(12) United States Patent
Richardson et al.

(10) Patent No.: US 8,005,987 B2
(45) Date of Patent: Aug. 23, 2011

(54) MULTI-REPRESENTATION MEDIA EVENT HANDOFF

(75) Inventors: Roger D. Richardson, Mundelein, IL (US); Chad L. Biederman, Montgomery, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/705,806

(22) Filed: Feb. 15, 2010

(65) Prior Publication Data

US 2010/0146573 A1 Jun. 10, 2010

Related U.S. Application Data

(63) Continuation of application No. 11/461,507, filed on Aug. 1, 2006, now abandoned.

(51) Int. Cl.
*H04M 3/00* (2006.01)
*H04N 7/16* (2006.01)
*G06F 15/173* (2006.01)

(52) U.S. Cl. .......... 709/239; 709/238; 709/245; 725/62; 455/420

(58) Field of Classification Search .......... 709/204–207, 709/208–211, 238–239; 725/62, 75; 455/3.01–3.06, 455/418–420
See application file for complete search history.

(56) References Cited

U.S. PATENT DOCUMENTS

| | | | |
|---|---|---|---|
| 5,440,351 A * | 8/1995 | Ichino | 348/729 |
| 5,461,427 A | 10/1995 | Duffield et al. | |
| 5,832,223 A | 11/1998 | Hara et al. | |
| 6,321,991 B1 | 11/2001 | Knowles | |
| 2001/0027560 A1 | 10/2001 | Simon | |
| 2002/0069419 A1 | 6/2002 | Raverdy et al. | |
| 2003/0073432 A1 * | 4/2003 | Meade, II | 455/420 |
| 2003/0115612 A1 | 6/2003 | Mao et al. | |
| 2003/0217057 A1 | 11/2003 | Kuroiwa et al. | |
| 2004/0027375 A1 | 2/2004 | Ellis et al. | |
| 2004/0133919 A1 | 7/2004 | Incentis | |
| 2004/0214541 A1 | 10/2004 | Choi | |
| 2004/0230687 A1 | 11/2004 | Nakamura et al. | |
| 2004/0237104 A1 | 11/2004 | Cooper et al. | |
| 2005/0091689 A1 | 4/2005 | Lee | |
| 2005/0100028 A1 | 5/2005 | Knauerhase et al. | |

(Continued)

OTHER PUBLICATIONS

Patent Cooperation Treaty, "Notification of Transmittal of the International Search Report and the Written Opinion of the International Searching Aithority, or the Declaration" for International Appln. No. PCT/US2007/67517 Jul. 29, 2008, pp. 1-6.

(Continued)

*Primary Examiner* — Brendan Higa
(74) *Attorney, Agent, or Firm* — Elahe Toosi; Sylvia Chen

(57) ABSTRACT

A system and method provides transition continuity for an event across a plurality of media representation device types. The system and method allow identification information for a media event such as a sports game, talk show, music, video, etc. to be handed-off between various media presentation devices such as radios, broadcast televisions, cable television set top boxes, an internet connected computer, satellite receivers, and multimedia cellular phones. A multi-representation media event hand-off method includes receiving (804) a first event identifier that corresponds to a first media representation of an event, correlating (808) the first event identifier to a second event identifier that corresponds to a second media representation of the event, and transmitting (810) data indicative of the second event identifier to a media device that facilitates presentation of the second media representation.

11 Claims, 4 Drawing Sheets

U.S. PATENT DOCUMENTS

| | | |
|---|---|---|
| 2005/0114891 A1 | 5/2005 | Wasenius |
| 2005/0144321 A1* | 6/2005 | Forsberg ............... 709/245 |
| 2005/0166232 A1 | 7/2005 | Lamkin et al. |
| 2005/0201720 A1 | 9/2005 | Toyoshima |
| 2005/0251394 A1 | 11/2005 | Carro |
| 2006/0184969 A1 | 8/2006 | Yamamoto |
| 2006/0202802 A1 | 9/2006 | Seppa |
| 2006/0211410 A1 | 9/2006 | Deniau et al. |
| 2006/0253874 A1* | 11/2006 | Stark et al. ............... 725/62 |
| 2006/0253880 A1 | 11/2006 | Bhakta et al. |
| 2007/0004334 A1 | 1/2007 | Tsuchiyama |
| 2007/0011335 A1* | 1/2007 | Burns et al. ............ 709/227 |
| 2007/0054627 A1 | 3/2007 | Wormald |
| 2007/3053514 | 3/2007 | Imai et al. |
| 2007/0099560 A1 | 5/2007 | Bowen et al. |
| 2007/0107008 A1 | 5/2007 | Dybus |
| 2007/0202923 A1* | 8/2007 | Jung et al. ............... 455/566 |
| 2008/0086550 A1* | 4/2008 | Evora et al. ............ 709/223 |
| 2008/0194208 A1* | 8/2008 | Tischer et al. ............ 455/68 |

OTHER PUBLICATIONS

United States Patent and Trademark Office, "Final Office Action Summary" for U.S. Appl. No. 11/461,507, Dec. 2, 2008, pp. 1-12.
United States Patent and Trademark Office, "Non-Final Office Action Summary" for U.S. Appl. No. 11/461,507, Jun. 24, 2009, pp. 1-10.
The State Intellectual Property Office of the People's Republic of China, "Notification of the First Office Action" for Chinese Pat. Appln. No. 200780028533.9, Oct. 12, 2010, 11 pages.
United States Patent and Trademark Office, "Non-Final Office Action Summary" for U.S. Appl. No. 11/461,507, Jun. 11, 2008, pp. 1-10.
United States Patent and Trademark Office, "Non-Final Office Action Summary" for U.S. Appl. No. 11/461,507, Dec. 9, 2009, pp. 1-13.

* cited by examiner

MULTI-REPRESENTATION MEDIA EVENT HANDOFF

CROSS-REFERENCE TO RELATED APPLICATION

This application is a continuation of U.S. patent application Ser. No. 11/461,507, filed Aug. 1, 2006.

TECHNICAL FIELD

The present invention generally relates to wireless and media systems, and more particularly to channel handoff methods for wireless and media systems.

BACKGROUND

Entertainment events such as news, talk shows, sports, live concerts, music, movies, etc. are available from many types of media devices such as radios, broadcast televisions, cable television set top boxes, Internet-connected computers, satellite receivers, and multimedia cellular phones. Each of these media device types uses communication systems that may have different data rates, latency, mobility, and other properties. A single event, such as a concert or sporting event, may also be represented simultaneously through more than one media device, and each media device may be of the same or a different type. Moreover, media devices may have different service providers. Every representation of an event, regardless of the media device type or service provider, typically has an event identifier such as a radio frequency, a television channel number, an event start time, an event name, or other data that makes it possible for a user to select a medium for presentation of the event.

For example, a user of media may be listening to a live broadcast by a first media provider of a baseball game on the radio in her car during his commute from the office to her home. As is often the case, the game is also being simulcast live on a television channel by a second media provider. When the user arrives home, she may want to continue with the game by watching or listening to it on her home television. Unfortunately, the transition from the car to the home will typically result in a period of time during which the user will not receive any media representation of the game. Indeed, the user must enter the house, turn her television on, determine the correct television channel, and tune the television to the correct channel before she can resume her enjoyment of the game.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Example embodiments of the invention are described herein in the context of one practical application of listening to a baseball game on a radio and then transitioning to watching the baseball game on a home television set. While the transition may go from the radio to TV, the transition may also be done in the reverse order allowing the individual to move from TV to radio using the same processes in a different order. As used herein "media" are means for communication that can be used to convey information in an audio, visual, or audio-visual manner. For example, media may be made available by "media providers" such as television networks, radio networks, cable news networks, and internet websites. In some embodiments, media is delivered using one or more suitable communication networks.

As used herein an "event" is anything that can be represented by, described by, conveyed by, included in, or otherwise communicated by media. For example, an event may be, without limitation: a baseball game (or any sporting event), a concert, a play, a newscast, a situation comedy, a talk show, or the like.

As used herein a "media device" is a device for representing media. There are many media device types. For example, a media device type may be, without limitation: an FM radio, an AM radio, an analog television set, a satellite television set, a High-Definition Television (HDTV) television set, a computer running a Windows Media Player application, a cell phone with MP3 player, a personal digital assistant (PDA) with an WAV file player, a video game device, a stand-alone digital media player, or the like.

As used herein an "event identifier" is a label, symbol, token, or any suitably configured data or information that defines a particular media representation of an event. For example, an event identifier may indicate the event time, a channel number, a Universal Resource Locator (URL), the event name, or other information related to an event corresponding to a given media device and/or a given media device type (e.g., analog television set, FM radio, streaming media player, etc.). For example, one event identifier may correspond to a live over-the-air television broadcast of a baseball game, a second and different event identifier may correspond to a live cable television broadcast of the same baseball game, a third and different event identifier may correspond to a live Internet-based streaming video representation of the same baseball game, and a fourth and different event identifier may correspond to a live radio broadcast of the same baseball game.

Figure 1:
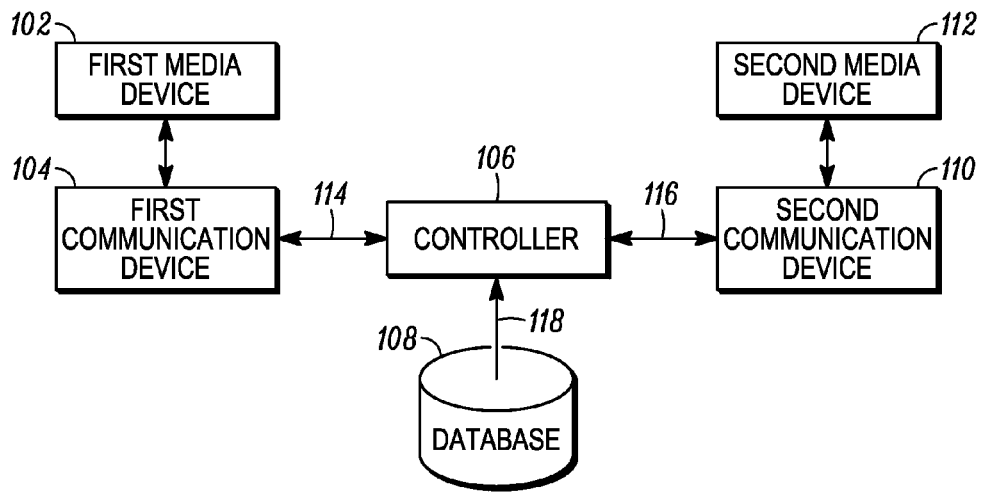
FIG. 1 is a schematic representation of a general system for accomplishing event handoff across media device types according to an example embodiment.

FIG. 1 is a schematic representation of a system 100 for handling an event handoff in a seamless manner across media devices according to an example embodiment. The various blocks depicted in FIG. 1 may be realized by any number of physical components or modules located throughout the system 100. A practical system 100 for an event handoff across various media device types may include a number of electrical components, circuits, and controller units other than those shown in FIG. 1. Conventional subsystems, features, and aspects of system 100 will not be described in detail herein.

The system 100 generally includes a first media device 102, a first communication device 104, a controller 106, a database 108, a second communication device 110, and a second media device 112. In this example, the first communication device 104 is coupled to the controller 106 using a first communication link 114 and the second communication device 110 is coupled to controller 106 using a second communication link 116. The controller 106 may include or cooperate with database 108; for example, the database 108 may be coupled to the controller 106 using a third communication link 118. Any one of these communication links may be wireless, wired, or a combination thereof. Although first media device 102 and first communication device 104 are depicted as separate and distinct devices in FIG. 1, an embodiment of system 100 may employ a device, machine, or subsystem that combines the functionality of the first media device 102 and the first communication device 104. Likewise, an embodiment of system 100 may employ a device, machine, or subsystem that combines the functionality of the second media device 112 and the second communication device 110.

The first media device 102 may be, without limitation, an AM/FM radio, a cellular communication device such as a cellular phone, a satellite or cable communication device such as television connected to a set top box, a broadcast television, an internet device such as a computer connected to the internet, a wireless enabled personal digital assistant, a digital media player, a car stereo, a video game device, or the like. The first media device 102 is suitably configured to support a first media representation of an event in progress (e.g., a live baseball game or a currently broadcasting television program), where the first media representation is identified by a first event identifier. In one example embodiment, the first media device 102 supports the first media representation by actually generating the first media representation at the first media device 102. In other words, the first media device 102 may actually play the audio, visual, or audio-visual presentation of the event in progress using its native capabilities and user interface.

The first media device 102 may also be configured to allow user selection of media representations of an event in a suitable manner, for example through buttons on a control panel, via a user interface, or via a remote control. For example, the first media device 102 may enable the user to select a broadcast channel, tune a radio receiver, activate a streaming media file, or the like. The first media device 102 is also configured to produce, obtain, or otherwise process event identifiers for media representations of events. In this example, first media device 102 processes the first event identifier, which corresponds to the first media representation of the event in progress. The event identifier may include, without limitation, a start time, a channel number, a device type identifier, the name of the particular event, and/or any information or data corresponding to the first media representation of the event. In this non-limiting example, the first media device 102 is a satellite radio and the first event identifier is a channel identifier that tunes the radio to the proper channel that is currently broadcasting a baseball game using conventional satellite radio transmission technology. The first media device 102 may also be configured to transmit the first event identifier to the first communication device 104. In this example, the radio is connected to an in-vehicle telematics device, and the first event identifier is accessed from the radio memory by the telematics device via a direct wire connection.

In practice, the first communication device 104 can be a transmitter or transceiver device, an interface device, a routing device, or any suitably configured device that operates as described herein. The first communication device 104, may be, without limitation: a cellular communication device, a satellite communication device, a Wi-Fi communication device, a fiber optic transmission device, a satellite television set top box, a cable television set top box, a computer, a text message device, or the like.

In the example embodiment depicted in FIG. 1, the first communication device 104 functions as a relay device between the first media device 102 and the controller 106. In this regard, the first communication device 104 is configured to receive the first event identifier (and/or data indicative of the first event identifier) from the first media device 102, and the first communication device 104 is configured to transmit the first event identifier (and/or data indicative of the first event identifier) to the controller 106. In one embodiment, the first event identifier is transferred from first media device 102 to first communication device 104 using a short range communication protocol, technique, or technology such as, without limitation: a wireless communication protocol that is compliant with BLUETOOTH™ wireless technology, a wireless communication protocol that is compliant with IEEE 802.11 wireless technology, an infrared point-to-point network such IrDA, or a connection cable (for example, without limitation, a direct wire from a car radio to a vehicle telematics module, an internal connection from an MP3 player in a cell phone to a cellular transceiver in the cell phone, or a wire from a television to a telephone). The first communication device 104 is also configured to transmit the first event identifier to the controller 106 using one or more short or long range communication techniques or technologies such as, without limitation: any of the short range communication techniques mentioned above, a cellular communication network, a telemetric network, a satellite network, an FM transmitter, a cable television infrastructure, a Wi-Fi compatible network, an optical fiber network, the internet, or the like.

The controller 106 may be implemented or performed with a general purpose processor, a content addressable memory, a digital signal processor, an application specific integrated circuit, a field programmable gate array, a microprocessor, a microcontroller, a state machine, or any suitable programmable logic device, discrete gate or transistor logic, discrete hardware components, or any combination thereof, designed to perform the functions described herein. In this example the controller 106 is coupled to the first communication device 104 and the second communication device 110, and the controller 106 is configured to receive, process, and correlate the event identifiers in the manner described herein. Although only one controller 106 is shown in FIG. 1, a practical implementation may utilize any number of distinct physical and/or logical controllers, which may be dispersed throughout system 100. For example, the functionality of the controller 106 may be incorporated into a television, a cellular switching system, a mobile device, a cable television server, or a digital video recorder (DVR). Indeed, controller 106 may be incorporated into first media device 102 and/or first communication device 104 in certain embodiments.

The controller 106 receives the first event identifier and/or data indicative of the first event identifier from the first communication device 104 and determines a second event identifier that corresponds to a second media representation of the same event in progress based on the first event identifier. The second event identifier also corresponds to the second media device 112, which is capable of presenting another media representation of the event. The controller 106 carries out the correlation by determining the second event identifier based upon the received first event identifier. In practice, the controller 106 may interrogate or access the database 108 to determine an appropriate second event identifier that corresponds to the first event identifier. In example embodiments, the controller 106 is responsible for communicating with the second communication device 110 to provide seamless media handoffs from one media device type to another media device type. The handoff can be prompted when the controller 106 transmits the second event identifier (and/or data indicative of the second event identifier) to the second communication device 110. The second event identifier is then processed to initiate a second media presentation of the event in progress at the second media device 112. This seamless handoff can be performed automatically and without any user interaction.

The database 108 may be any suitable data storage area, device, or architecture that is formatted to support the operation of the system 100. The database 108 is configured to store, maintain, and provide data as needed to support the functionality of system 100 in the manner described below. In practical embodiments, database 108 may be realized as RAM memory, flash memory, ROM memory, EPROM memory, registers, a hard disk, a removable disk, a CD-ROM, or any other form of storage medium known in the art. In one embodiment, the database 108 is coupled to the controller 106 and is suitably configured to provide data access to the controller 106. Alternatively, the controller 106 may include the database 108. Moreover, the database 108 may be a local database coupled to the first communication device 104 or the second communication device 110, or it may be a remote database, for example, without limitation, a satellite database, a personal computer database, a broadcast TV database, and a cable TV data base that stores parameters for the system 100. The database is configured to maintain a list of the various event identifiers for events and media devices. The database is further configured to accommodate searching of the event identifiers for a particular event, and to enable controller 106 to process the alternative event identifiers for the same event.

The second communication device 110 may be a receiver or transceiver device, an interface device, a routing device, or any suitably configured device as described above for first communication device 104. In this example, the second communication device 110 supports the second media representation of the event in progress by communicating the second event identifier to the second media device 112. In other words, the second communication device 110 can function as an interface or relay device to initiate the presentation of the second media representation at the second media device 112. In this regard, the second device may be configured to receive the second event identifier (and/or data indicative of the second event identifier) from the controller 106. This information can be transmitted using, for example, any of the short range or long range communication techniques or technologies mentioned previously. The second communication device 110 is coupled to the second media device 112, and the second communication device 110 is also configured to transmit the second event identifier (and/or data indicative of the second event identifier) to the second media device 112 using one or more of the data communication techniques, technologies, or protocols described herein.

The second media device 112 may be, without limitation: an AM/FM radio, a cellular communication device with streaming media player, a satellite or cable communication device such as a television connected to a set top box, a broadcast television, an internet device such as a computer connected to the internet, a wireless enabled personal digital assistant, or any device or apparatus described above for first media device 102. The second media device 112 is coupled to the second communication device 110, and is configured to receive the second event identifier (and/or data indicative of the second event identifier) from the second communication device 110. The second media device 112 is also configured to process the received information to facilitate the media handoff procedure described in more detail below. Moreover, the second media device 112 may be configured to allow user selection of the second media representation of the event in progress.

For purposes of this example, the second media device 112 is a broadcast television. In connection with the seamless media handoff procedure, this television will be automatically tuned to the proper station such that the user can enjoy the same event in progress delivered via the second media representation. This handoff process can occur with little or no user involvement.

Figure 2:
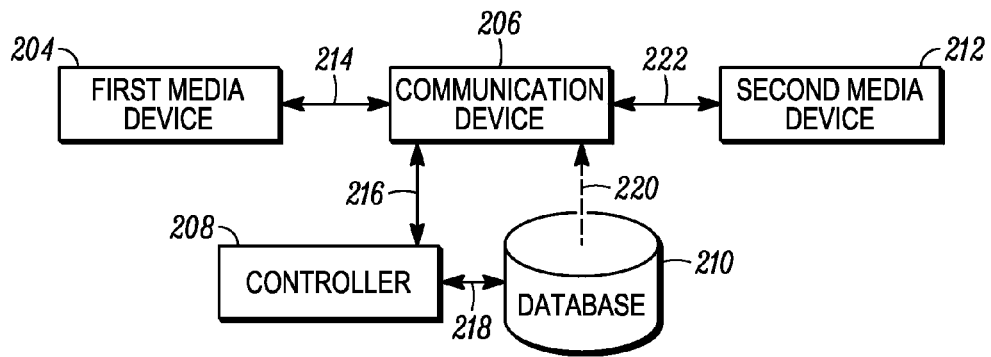
FIG. 2 is a schematic representation of a system for handling an event handoff across media device types according to a second example embodiment.

FIG. 2 is a schematic representation of a system 200 for handling an event handoff across media device types according to a second example embodiment. System 200 shares a number of elements and features with system 100 (see FIG. 1), and common features, functions, and structure will not be redundantly described here in the context of system 200. The system 200 generally includes a first media device 204, a communication device 206, a controller 208, a database 210, and a second media device 212. In this example, the first media device 204 is coupled to the communication device 206 using a first communication link 214, the communication device 206 is coupled to the controller using a second communication link 216, the communication device 206 is coupled to the database 210 using a third communication link 220 (this link is optional), and the communication device 206 is coupled to the second media device 212 using a fourth communication link 222. The controller 208 may be coupled to the database 210 using a fifth communication link 218. Any one of these communication links may be wireless, wired, or a combination thereof.

The basic operating elements of system 200 are explained in detail in the context of FIG. 1 above. In this embodiment, however, communication device 206 represents a single relay or interface device that facilitates the media handoff process by obtaining the first event identifier from the first media device 204, communicating with the controller 208 to obtain the second event identifier, and transmitting the second event identifier to the second media device 212. Thus, the communication device 206 (instead of the controller 106 as in system 100) is responsible for sending the second event identifier to the second media device 212 to provide seamless media handoffs from one media device type to another media device type. As explained above in connection with system 100, a practical embodiment may utilize a single device that combines the functionality of the first media device 204 and the communication device 206. Moreover, the controller 208 and the database 210 may be combined with the communication device 206 (for example, in a cell phone).

Figure 3:
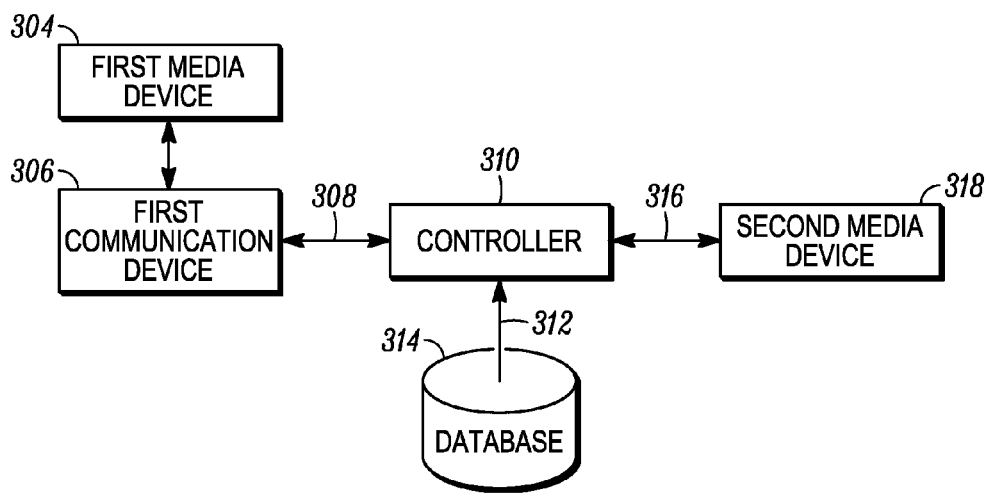
FIG. 3 is a schematic representation of a system for handling an event handoff across media device types according to a third example embodiment.

FIG. 3 is a schematic representation of a system 300 for handling an event handoff across media device types according to a third example embodiment. System 300 shares a number of elements and features with system 100 (see FIG. 1), and common features, functions, and structure will not be redundantly described here in the context of system 300. The system 300 generally includes a first media device 304, a first device 306, a controller 310, a database 314, and a second media device 318.

In this example embodiment, the first device 306 is coupled the controller 310 using a first communication link 308, the controller 310 is coupled to the database 314 using a second communication link 312, and the second media device 318 is coupled to controller 310 using a third communication link 316. Any one of these communication links may be wireless, wired, or a combination thereof as mentioned previously.

The basic elements of system 300 are explained in detail in the context of FIG. 1 above. In this example embodiment the controller 310 (rather than a communication device) is responsible for sending the second event identifier directly to the second media device 318 to provide seamless media hand-offs from the first media device 304 to the second media device 318. In this embodiment the first media device 304 and the first device 306 may be combined into a single component, and the controller 310 and the database 314 may also be combined.

Figure 4:
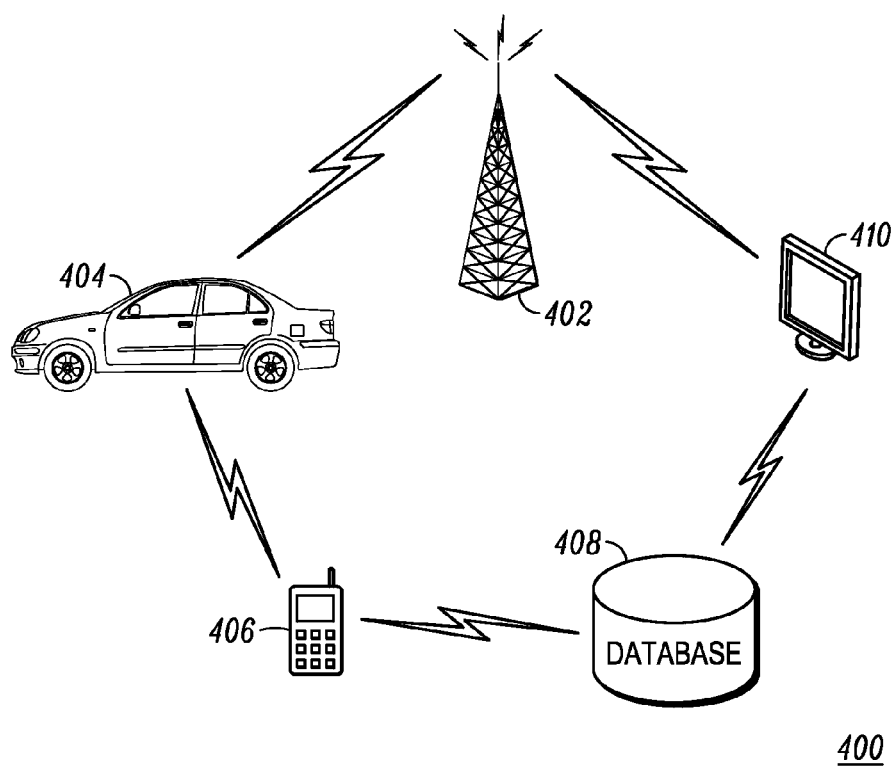
FIG. 4 is a schematic representation of a first example operating environment for an event hand-off across media device types.

FIG. 4 is a schematic representation of a first example operating environment 400 for an event hand-off across media device types. Environment 400 represents one practical deployment of a system such as system 100, system 200, or system 300. In this regard, environment 400 may share a number of elements and features with system 100, system 200, or system 300, and common features, functions, and structure will not be redundantly described here in the context of environment 400. For illustrative purposes, the following description of FIG. 4 may refer to elements mentioned above in connection with FIG. 1.

In this example embodiment, a user selects an event, e.g., a baseball game, that is being broadcast from a media provider or source 402. This broadcast represents a first media representation of the event, and the first media representation is presented in audio format in a car radio. In this regard, the car radio system or the car 404 itself may be considered to be a first media device. The user can manipulate the car radio to select the appropriate radio station to listen to the baseball game on the car radio. The car radio in the car 404 can automatically (or in response to a user instruction) send a first event identifier to a mobile device 406 via, for example, BLUETOOTH™ wireless technology. In this example, mobile device 406 represents a first device or a first communication device that relays the first event identifier for further processing. The mobile device 406 may then send the first event identifier to a controller/database 408 via, for example, a cellular communication network.

The controller/database 408 receives the first event identifier from the mobile device 406, processes the first event identifier, and obtains a second event identifier corresponding to a second media representation for a second media device type. In this example, a broadcast television 410 represents the second media device, and the broadcast television program represents the second media representation of the event in progress. The controller/database 408 obtains data indicative of the second event identifier and then sends the data indicative of the second event identifier to the broadcast television 410. Although not depicted in FIG. 4, the second event identifier may be received by a set top box or a tuner component via, for example, a WiFi communication network. The set top box or tuner can then initiate presentation of the baseball game at television 410 using the second media representation. In this manner the user need not search for a television channel that is broadcasting the same baseball game event and the user can enjoy the baseball game event on the broadcast television 410 with less interruption.

Figure 5:
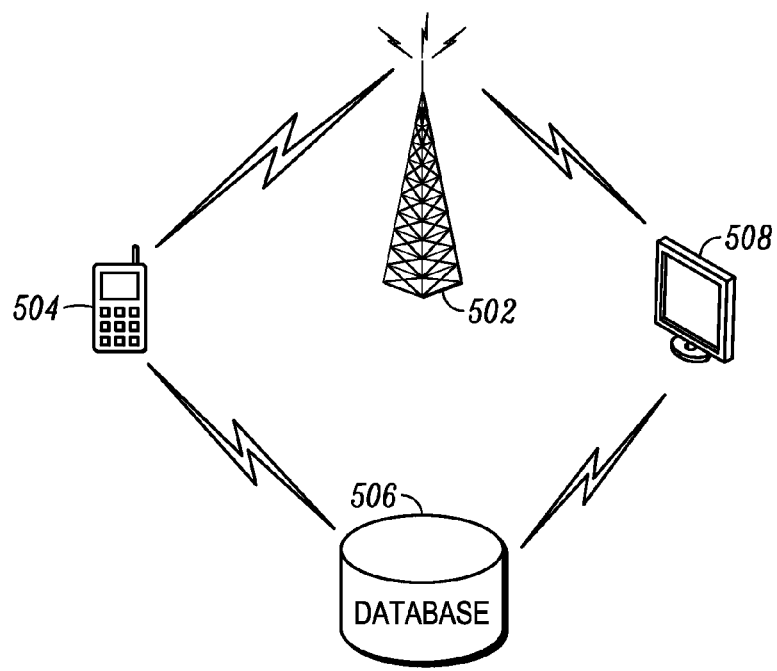
FIG. 5 is a schematic representation of a second example operating environment for an event hand-off across media device types.

FIG. 5 is a schematic representation of a second example operating environment 500 for an event hand-off across media device types. Environment 500 represents one practical deployment of a system such as system 100, system 200, or system 300. Environment 500 may share a number of elements and features with environment 400, and common features, functions, and structure will not be redundantly described here in the context of environment 500. For illustrative purposes, the following description of FIG. 5 may refer to elements mentioned above in connection with FIG. 2.

In this example embodiment, a user initially receives a media representation of an event on a mobile device 504, e.g., a cell phone, and will enjoy a seamless handoff of the event to a television set 508. As shown in FIG. 5, an event such as a baseball game may be broadcast from a media provider or source 502 to a mobile device 504 using a digital video broadcast handheld (DVB-H) format. The mobile device 504 may generate a first media representation of the event using its native DVB-H processing and user interface features. The mobile device 504 will automatically (or in response to user interaction) send a first event identifier to a controller/database 506. The controller/database 506 receives the first event identifier and determines a second event identifier that corresponds to a different (television) media representation of the same event. The controller/database 506 can then proceed as described above and communicate with a television set 508 using mobile device 504 to initiate a second media representation of the event. In contrast to the system depicted in FIG. 4, the environment 500 employs mobile device 504, which functions as both a media device and a communication device for controller/database 506.

Figure 6:
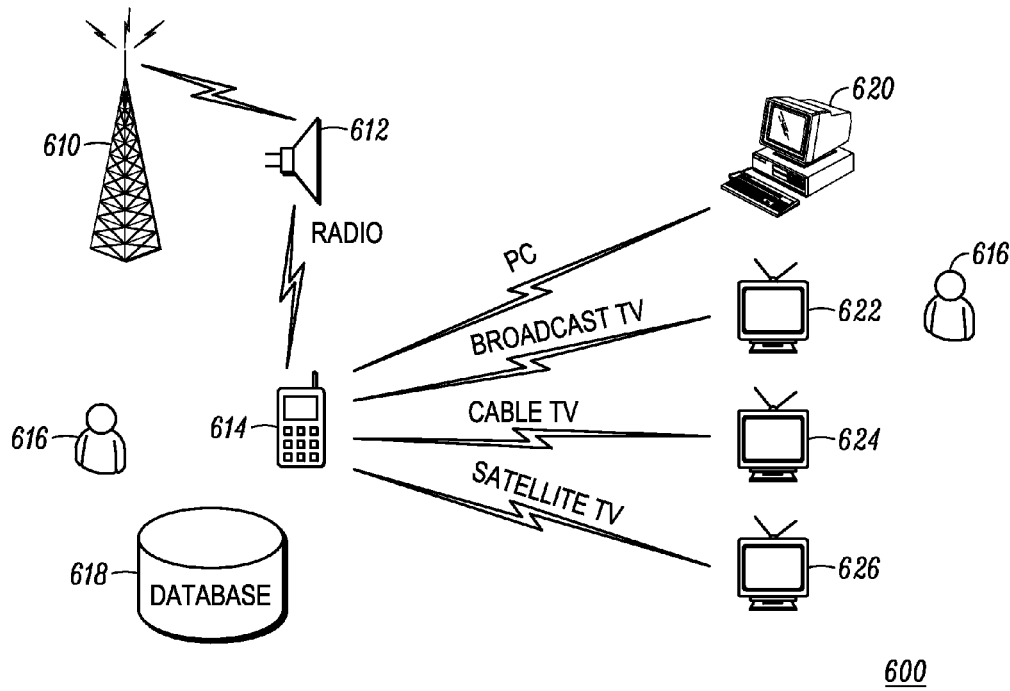
FIG. 6 is a schematic representation of a third example operating environment for an event hand-off across media device types.

FIG. 6 is a schematic representation of a third example operating environment 600 for an event hand-off across media device types. Environment 600 represents one practical deployment of a system such as system 100, system 200, or system 300. Environment 600 may share a number of elements and features with environment 400 and 500, and common features, functions, and structure will not be redundantly described here in the context of environment 600. For illustrative purposes, the following description of FIG. 6 may refer to elements mentioned above in connection with FIG. 2.

In this example embodiment, a user 616 initially receives a media representation of an event on a mobile device, e.g., a cell phone 614, and will enjoy a seamless handoff of the event to a personal computer and to a plurality of television sets. As shown in FIG. 6, an event such as a baseball game may be broadcast from a media provider or source 610 to a mobile device 614 via an AM radio 612. The mobile device 614 may generate a first media representation of the event using its native AM receiver and user interface features. The mobile device 614 will automatically (or in response to user interaction) send a first event identifier to a controller/database 618. The controller/database 618 receives the first event identifier and determines a second event identifier that corresponds to a different media representation of the same event on each of the second media devices 620, 622, 624, 626. The controller/database 618 can then proceed as described above and communicate through cell phone 614 with a personal computer 620, a broadcast television 622, a cable television 624, and a satellite television 626 to initiate a multiple second media representations of the event. The controller/database 618 can also allow communication in reverse order from the media devices 620, 622, 624, 626 to the cell phone 614. Similar to the system depicted in FIG. 5, the environment 600 employs a mobile device 614, which functions as both a media device and a communication device for controller/database 618. Moreover, the controller/database 618 may be combined with the cell phone 614.

Figure 7:
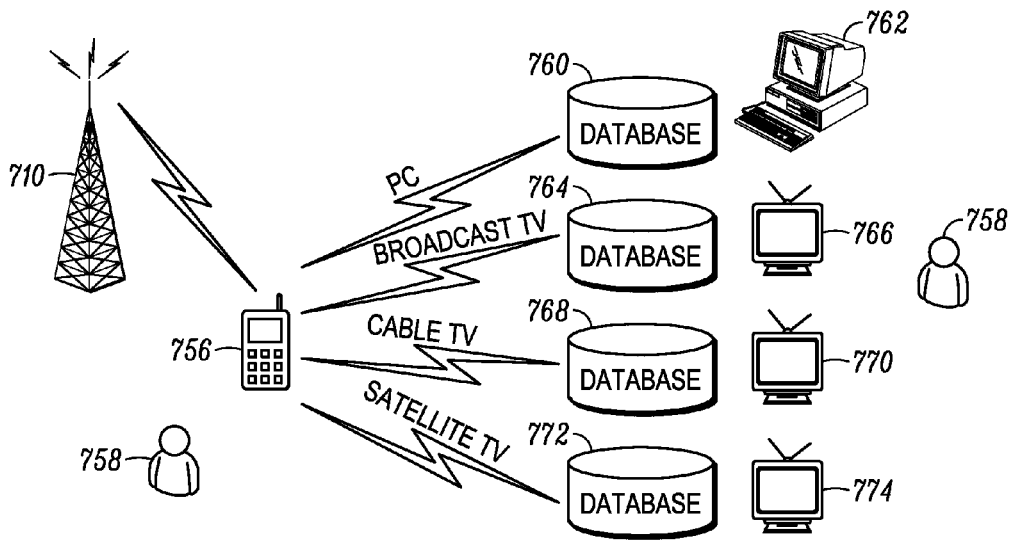
FIG. 7 is a schematic representation of a fourth example operating environment for an event hand-off across media device types.

FIG. 7 is a schematic representation of a fourth example operating environment 700 for an event hand-off across media device types. Environment 700 represents one practical deployment of a system such as system 100, system 200, or system 300. In this regard, environment 700 may share a number of elements and features with system 100, system 200, system 300, or environment 600, so common features, functions, and structure will not be redundantly described here in the context of environment 700. For illustrative purposes, the following description of FIG. 7 may refer to elements mentioned above in connection with FIG. 3.

In this example embodiment, a user 758 initially receives a media representation of an event on a mobile device, e.g., a cell phone 756, and will enjoy a seamless handoff of the event to a personal computer and to a plurality of television sets as described above in context of environment 600. In this example embodiment, in contrast to environment 600, each controller/database 760, 764, 768, 772 may be combined with its respective second media device 762, 766, 770, 774 (rather than combined with the cell phone 756). Each of the second media devices 762, 766, 770, 774 functions as a relay or interface device for each respective controller/database 760, 764, 768, 772. Each controller/database 760, 764, 768, 772 can proceed as described above and communicate with a personal computer 726, a broadcast television 732, a cable television 738, and a satellite television 744 to initiate a second media representation of the event.

Figure 8:
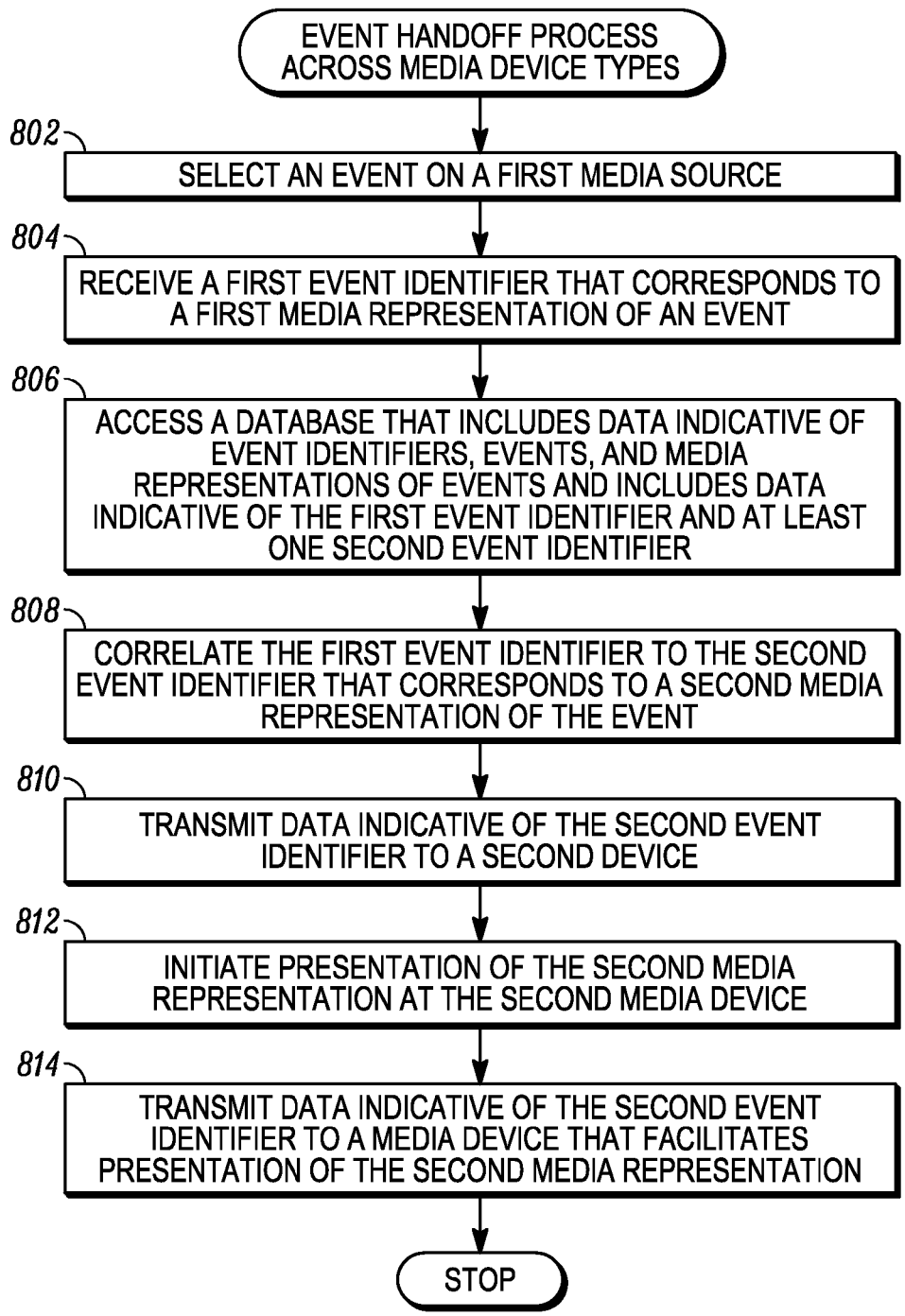
FIG. 8 is a flow chart of an example process for an event hand-off across media device types.

FIG. 8 is a flow chart of an example event handoff process 800 across various media device types, which may be performed by one or more of the systems described above. Process 800 operates an event handoff across various media device types by processing event identifiers that correspond to different media devices, media representations, and/or media device types. The various tasks performed in connection with process 800 may be performed by software, hardware, firmware, or any combination thereof. For illustrative purposes, the following description of process 800 may refer to elements mentioned above in connection with FIGS. 1-7. In practical embodiments, portions of process 800 may be performed by different elements of a system, e.g., the first communication device 104, the controller 106, the database 108, and the second communication device 110 with a system 100 such as shown in FIG. 1.

The process 800 allows the event identifiers for events such as talk programs, music tracks, video programs, baseball games, news programs, situation comedies, or other media event programs to be handed-off across a plurality of media device types as mentioned above while maintaining channel and content selection continuity to allow a user to have uninterrupted access. As will be described in detail below, the process functions, in brief and with reference to FIG. 1, as follows: an event is selected by the user on the first media device, a first event identifier that corresponds to the first media representation of the event is transmitted from the first media device 102 to the first communication device 104, and the controller 106 receives the first event identifier from the first communication device 104. The controller 106 then accesses the database 108 to match the first event identifier to a second event identifier that corresponds to a second media representation of the event compatible with the second media device, and transmits data indicative of the second event identifier to the second communication device 110. The second communication device 110 transmits the data indicative of the second event identifier to the second media device 112 and the second media device 112 is set to continue a media representation of the event.

The event handoff process 800 across various media device types may begin with an event being selected on the first media device 102 (task 802). The event (for example, a baseball game) may be identified by a user or automatically selected, for example by a prescheduler such as a digital video recorder (DVR) or the event may be a current selection on a radio channel (in one example embodiment, the radio is connected to an in-vehicle telematics device, and the event identifier is taken from the radio memory by the telematics device via a direct wire connection). The event identifier from the first media device 102 is given an appropriate formatting according to any one of the communication protocols as mentioned above in the context of FIG. 1, and prepared for transmission. This may be done automatically or on command by the user. The first event identifier (for example, an event time, a channel number, and/or name of the event) may then be sent to the first communication device 104 by any of the communication protocols as mentioned in the context of FIG. 1.

The controller 106, may then receive, via the first communication device 104, the first event identifier that corresponds to the first media representation of the event (task 804) using any one of the short range or long range technologies mentioned above in the context of FIG. 1. The controller 106 may then access a database 108 that includes data indicative of event identifiers, events, media representations of events, and includes data indicative of the first event identifier and at least one second event identifier (task 806) and continue to correlate the first event identifier to a second event identifier that corresponds to a second media representation of the event (task 808). In connection with task 808, process 800 may also determine the second media type for the second media representation. In practice, the database 108 may be actively updated to reflect changes in available event programming. Furthermore, the database may support a unique predefined media device type configuration to reflect user choices of the available event programming. For example, a user may select to enable transitions from a network radio station to a TV broadcast TV station in the same network.

Process 800 then transmits the data indicative of the second event identifier to the second communication device 110 (task 810) using any one of the short range or long range communication systems mentioned in the context of FIG. 1 above. Data indicative of the second event identifier may include: a time, a channel number, an event name, or the like. Process 800 then proceeds to initiate presentation of the second media representation at the second media device via the second communication device (task 812) and continues with the second communication device transmitting the data indicative of the second event identifier to a second media device (i.e., of a second media device type) that facilities representation of the event using a second media source by any one of the communication systems mentioned above in the context of FIG. 1 (task 814). For example, the second device may be, without limitation, a broadcast television set and may initiate continuation of broadcasting a baseball game from a radio channel on the second media device type (which may be, for example, a broadcast television). The second media device type may be, without limitation, a cellular communication device, a satellite communication device, a radio, a cable communication device, a broadcast television, an internet communication device, or a computer device with internet connection. The second media representation may be manually selected by the user or automatically selected, for example, without limitations, by a digital video recorder (DVR) to reflect general user choices of available programming.

The previous detailed description is merely illustrative in nature and is not intended to limit the embodiments of the invention or the application and uses of such embodiments. Furthermore, there is no intention to be bound by any expressed or implied theory presented in the preceding technical field, background, brief summary or the detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g. memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques and components related to signal processing, cabling, wireless and wire line protocols, wireless communication systems, wireless networks, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict example arrangements of elements, additional intervening elements, devices, features, or components may be present in an embodiment of the invention (assuming that the functionality of the system is not adversely affected).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A multi-representation media event handoff method for a wireless mobile media device and a second media device that is different than, physically separate from, and physically distinct from the wireless mobile media device, the method comprising:
   presenting, at the wireless mobile media device, a first media type representation of an event in progress, the first media type representation of the event in progress being identified by a first event identifier;
   interrogating a database with the wireless mobile media device to obtain a second event identifier that is correlated to the first event identifier, the database being physically separate and physically distinct from both the wireless mobile media device and the second media device;
   receiving, at the wireless mobile media device, the second event identifier obtained from the database; and
   transmitting the second event identifier from the wireless mobile media device to the second media device to initiate presentation of a second media type representation of the event in progress at the second media device in a manner that maintains content selection continuity from the first media type representation of the event in progress to the second media type representation of the event in progress, the second media type representation of the event in progress being identified by the second event identifier, and the second media type representation of the event in progress having a different presentation format than the first media type representation of the event in progress.

2. The method of claim 1, further comprising:
   in response to receiving the second event identifier at the second media device, presenting, at the second media device, the second media type representation of the event in progress.

3. The method of claim 2, wherein the presenting steps are performed to maintain media handoff continuity during transition from the first media type representation of the event in progress to the second media type representation of the event in progress.

4. The method of claim 1, further comprising:
   actively updating event identifiers in the database to reflect changes in available event programming.

5. The method of claim 1, wherein:
   the first media type representation of the event in progress is presented at the wireless mobile media device using native capabilities of the wireless mobile media device.

6. The method of claim 5, wherein:
   the first media type representation of the event in progress is presented at the wireless mobile media device using a digital video broadcast handheld (DVB-H) format;
   the second media device is a set top box; and
   the second media type representation of the event in progress uses a media format other than DVB-H.

7. A multi-representation media event handoff method for a system comprising a first media device and a second media device, wherein the first media device and the second media device are different than, physically separate from, and physically distinct from one another, the method comprising:
   presenting, at the first media device, a first media type representation of an event in progress, the first media type representation of the event in progress being identified by a first event identifier;
   wirelessly transmitting the first event identifier from the first media device to obtain a second event identifier that is correlated to the first event identifier, the second event identifier identifying a second media type representation of the event in progress, wherein the second media type representation is different than the first media type representation;

wirelessly receiving, at the first media device, the second event identifier that is correlated to the first event identifier; and wirelessly sending the second event identifier from the first media device to the second media device to initiate presentation of the second media type representation of the event in progress at the second media device in a manner that maintains content continuity from the first media type representation of the event in progress to the second media type representation of the event in progress.

8. The method of claim 7, further comprising:
upon receipt of the second event identifier at the second media device, presenting the second media type representation of the event in progress at the second media device, automatically and without any user interaction.

9. The method of claim 7, further comprising maintaining the first event identifier and the second event identifier in a database that is physically separate and physically distinct from both the first media device and the second media device.

10. The method of claim 9, wherein:
the transmitting step wirelessly transmits the first event identifier to the database; and
the receiving step wirelessly receives the second event identifier from the database.

11. A multi-representation media event handoff method for a system comprising a mobile device, a media presentation device, and a database, wherein the mobile device, the media presentation device, and the database are different than, physically separate from, and physically distinct from one another, the method comprising:

presenting a first media type representation of an event in progress at the mobile device, the first media type representation of the event in progress being identified by a first event identifier;

wirelessly interrogating the database with the mobile device to obtain a second event identifier that is correlated to the first event identifier;

receiving, at the mobile device, the second identifier obtained from the database;

wirelessly sending the second event identifier from the mobile device to the media presentation device; and upon receipt of the second event identifier at the media presentation device, presenting a second media type representation of the event in progress at the media presentation device in a manner that maintains content continuity from the first media type representation of the event in progress to the second media type representation of the event in progress, wherein the first media type representation of the event in progress and the second media type representation of the event in progress have different presentation formats.

\* \* \* \* \*